United States Patent [19]

Tsai

[11] 4,454,304

[45] Jun. 12, 1984

[54] METHOD AND MATERIAL FOR PRODUCING HIGH GREEN STRENGTH RUBBER COMPOUNDS

[75] Inventor: Tom C. H. Tsai, Baton Rouge, La.

[73] Assignee: Copolymer Rubber & Chemical Corp., Baton Rouge, La.

[21] Appl. No.: 256,005

[22] Filed: Apr. 22, 1981

[51] Int. Cl.³ .............................................. C08L 45/00
[52] U.S. Cl. .................................... 525/210; 525/209; 525/213; 525/214; 525/215; 525/217; 525/222; 525/223; 525/233; 525/234; 525/235; 525/237
[58] Field of Search ............... 525/214, 215, 217, 233, 525/234, 235, 209, 210, 213, 236; 526/281, 282, 292

[56] References Cited

U.S. PATENT DOCUMENTS

| | | | |
|---|---|---|---|
| 3,904,580 | 9/1975 | Lasis et al. | 260/42.47 |
| 3,969,330 | 7/1976 | Lasis et al. | 526/14 |
| 4,005,053 | 1/1977 | Briggs et al. | 260/33.6 |
| 4,048,261 | 9/1977 | Tarmer | 525/217 |
| 4,052,542 | 10/1977 | Wei et al. | 526/46 |
| 4,222,906 | 9/1980 | Briggs et al. | 260/5 |

FOREIGN PATENT DOCUMENTS

| | | |
|---|---|---|
| 840096 | 9/1976 | Belgium . |
| 2528142 | 1/1976 | Fed. Rep. of Germany . |
| 2613050 | 9/1977 | Fed. Rep. of Germany . |
| 2613051 | 9/1977 | Fed. Rep. of Germany . |
| 7603181 | 9/1977 | Netherlands . |

OTHER PUBLICATIONS

Buckler, E. J. et al., "New Findings on General Purpose Synthetic Rubbers," *Elastomerics*, Dec. 1977, p. 32.
Belgorodskiii, I. M. et al. "Making Green Strength of Synthetic Polyisoprene Equal to Natural Rubber", *Rubber World*, Apr. 1978, p. 36.

*Primary Examiner*—J. Ziegler
*Attorney, Agent, or Firm*—McDougall, Hersh & Scott

[57] ABSTRACT

The method of producing a rubber compound having high green strength comprising providing separate rubber components one of which contains a tertiary amine component bound therein and the other of which contains a halogen cross linking agent bound therein, and blending the two rubber components to form a rubber blend having high green strength.

12 Claims, No Drawings

METHOD AND MATERIAL FOR PRODUCING HIGH GREEN STRENGTH RUBBER COMPOUNDS

This invention relates to rubber compounds having improved green strength to enable processing to the desired shape before subjecting the rubber compound to cure or vulcanization.

Green strength is a term applied to the strength, cohesiveness and dimensional stability of rubber compounds before they are cured or vulcanized. Green strength becomes an important factor, for example, in the manufacture of radial tires where the flat belt formed of the rubber and reinforcing fibers is considerably deformed when expanded by blowing to conform the belt to the shape of the tire mold. The rubber compound must stretch for a considerable distance without necking or breaking and with the tension uniformly distributed to maintain uniformity in reinforcing fiber concentration during the stretching of the rubber to conform with the tire mold. Synthetic rubbers, such as SBR, NBR, polybutadiene rubbers, polyisoprene rubbers and the like and blends thereof, such as blends of SBR or NBR with polybutadienes, are faced with the problem of sufficient green strength and elongation for use in the manufacture of radial tires.

U.S. Pat. Nos. 4,052,542 and 3,904,580 describe a method for improvement of the green strength of such rubbers by the incorporation of a small amount of a tertiary amine group into the rubber as a comonomer during polymerization and cross linking the modified rubber with a dihalogen compound, such as dibromobutene-2, dibromoxylene, 4,4'-bis(bromoacetyl)diphenyl.

While the green strength of synthetic rubbers is improved by the technique described above, numerous problems are present in the cross linking reaction with the described cross linking compounds. One of the problems, pointed out in the aforementioned patents, resides in the low melting point and the high vapor pressure of the cross linking agent. Another is the obnoxious vapors given off by the cross linking agent under the conditions of use whereby it becomes difficult to work with the material in commercial application.

The high vaporization of the halogen cross linking agents from the compounded rubber results in substantial, as well as uncontrolled, loss of reactant with corresponding non-uniformity in the processing of the compound and in the product that is formed thereof. Further, the dihalogen cross linking agents have been found difficult to incorporate efficiently and effectively into the rubber polymer while in the latex coagulation stage.

It is an object of this invention to provide a means and method wherein the problems described can be overcome; whereby dihalogen and other cross linking agents can be incorporated into the rubber polymer for the desired cross linking reaction to provide improved green strength without being confronted with the problems of loss or odor, and wherein the cross linking agent can be incorporated efficiently and effectively into the rubber for accurate control of the amount present in the compound, with resultant uniformity in product; and it is a related object to provide a method for achieving high green strength in compounds formed of synthetic rubbers to enhance their utilization in the manufacture of tires, especially radial tires.

Briefly described, the basic concept of the invention resides in the fabrication of one rubber component in which the tertiary amine group is incorporated in the manner previously employed by including a monomer containing the amine group with the rubber forming monomers for copolymerization or reaction therewith, and a second rubber component in which the cross linking agent is incorporated by including the cross linking agent with the rubber forming monomers for copolymerization or reaction therewith so that the cross linking agent will form a part of the rubbery polymer, and then blending the two components to provide for the development of the desired high green strength without the problems heretofore raised as described in the prior practice.

The basic rubber polymers can be the same in both rubber components or one can be different than the other as when a blend of two different rubbers is desired in formulating the rubber compound. In either event, the green strength is improved to a marked degree.

The synthetic rubbery polymers with which the invention can be practiced include conjugated diolefin rubbery polymers based upon $C_4$-$C_6$ diolefins such as polybutadiene, polyisoprene and rubbery polymers of such conjugates, diolefins, such as butadiene, 1,3-isoprene, piperylene, 2,3-dimethyl butadiene, and cyclopentene included, with such unsaturated monomers as styrene, $\alpha$-methylstyrene and the vinyl toluenes, or with an acrylonitrile and methacrylonitrile. The preferred polymers employed in the practice of this invention are the rubbery polymers of butadiene and styrene (SBR) and butadiene acrylonitrile (NBR), alone or blended with polyisobutylene polymers.

The preferred rubbery SBR polymers employed in the present invention have bound butadiene contents of from 60-96% by weight and preferably 70-85% by weight and bound styrene contents of from 40-4% by weight and preferably 30-15% by weight. The preferred NBR polymers are rubbery polymers containing from 50-85% and preferably 60-75% by weight butadiene and 15-50% by weight and preferably 25-40% by weight acrylonitrile content.

The tertiary amine groups are introduced into the rubbery polymer by copolymerization with the butadiene and styrene or butadiene and acrylonitrile. Suitable monomers containing tertiary amine groups are represented by dimethyl-aminoethyl acrylate and dimethyl-aminoethyl methacrylate, diethyl aminoethyl acrylate and diethyl aminoethyl methacrylate, or other dialkyl aminoalkyl acrylate or methacrylate. Suitable also as monomers containing tertiary amino groups for incorporation into the rubbery polymer are pyridine monomers such as vinyl pyridine, methyl vinyl pyridine and other polymerizable tertiary amines.

The amount of tertiary amine groups incorporated in the polymer is relatively small, such as in the range of from about 0.5 millimoles to about 10 millimoles and preferably 0.75 millimoles to about 7.5 millimoles of the tertiary amine groups per 100 grams of polymer. On the weight bases, the tertiary amine can be incorporated in an amount within the range of 0.1-5 percent by weight, but it is preferred to make use of the amine in an amount less than 1.5 percent by weight of the polymer. The preferred tertiary amine group containing monomer for incorporation into the polymer is dimethyl-aminoethyl methacrylate, incorporated into the rubbery polymer in an amount within the range of about 0.1 to about 1.2 parts by weight per 100 parts by weight of the polymer.

The cross linking agents are introduced into the rubbery polymer component by copolymerization or reaction with the rubber forming monomers during polymerization to form the rubbery component, but the cross linking agent is preferably incorporated by addition during or immediately preceding the polymerization step in the rubber formation.

The cross linking agent can be broadly defined as unsaturated active halogen compound in which the unsaturated group is a polymerizable group. Suitable cross linking agents are represented by dibromobutene-2, dichlorobutene-2, dibromoxylene and αα-dichloroxylene or others of the dihalogen components described in U.S. Pat. No. 4,052,542, wherein the dihalogen cross linking agent is described as having two halogen groups located in conjugated relationship to the carbonyl group, and in which the preferred halogens are chlorine and bromine. Preferred usage is also made of benzylic and allylic halides and acetoxy halides such as vinyl benzyl chloride and 5-chloroacetoxy methyl-2-norbornene. The cross linking agent is incorporated into the rubbery polymer in an amount within the range of 0.05–4% by weight and preferably in an amount within the range of 0.25–2.5% by weight when based on the rubbery polymer or in an amount within the range of 0.25–5 mols halogen per mole of tertiary amine, when based on the amine component.

In formulating the rubbery component having high green strength, the two rubber components can be blended in the ratio of 10 parts by weight of the rubbery component containing the tertiary amine per 1 part by weight of the rubbery component containing the cross linking agent to 1 part by weight of the rubbery component containing the tertiary amine per 10 parts by weight of the rubbery component containing the cross linking agent but the two rubbery components are preferably blended in about equal amounts ±15%.

The invention will hereinafter be described by the following examples which are given by way of illustration, but not by way of limitation.

EXAMPLE 1

This example describes the preparation of the SBR latex containing N,N'-dimethyl-aminoethyl methacrylate.

A 320 ml portion of water, 0,6 g KCl, 0.2 g sodium salt of polymerized alkyl naphthalene sulfonic acid, 0.016 g tetrasodium salt of ethylene diamine tetra-acetic acid, 0.10 g sodium formaldehyde sulfoxylate, 80 ml soap solution containing 7.5% potassium soap of fatty acid and 2.5% potassium soap of rosin acid, 1.5 ml of activator solution, and 64 ml of styrene, 1.8 ml 30% dodecylmercaptan in toluene, and 0.8–1.075 ml N,N'-dimethyl-aminoethyl methacrylate were charged to a thoroughly cleaned reactor having a capacity of 28 oz. The activator solution was prepared by dissolving 1.25 g NaOH, 2.31 g ethylene diamine tetraacetic acid, and 2.0 g FeSO$_4$·7 H$_2$O in water made up to 100 ml. Then 146 g butadiene were charged to the reactor. The reactor was pressurized to 20 psi with nitrogen gas and a 5 ml portion of freshly prepared 1.2% Na$_2$S$_2$O$_4$ solution was introduced to scavenge residual oxygen. The materials were agitated in the reactor at 5°–6° C. for 30 minutes after which a 2.0 ml portion of 5% para-menthane hydroperoxide in styrene solution was introduced into the reactor to initiate polymerization. The polymerization was carried out at 5°–6° C. and the reaction was periodically sampled to determine the polymer content. Another 0.8–1.075 ml N,N'-dimethyl-aminoethyl methacrylate was introduced to the reaction when conversion reached 25–30%. The reaction was short stopped at 70% conversion with 20 ml of 1% sodium dimethyl dithiocarbamate and 1% diethyl hydroxyamine in water. The resulting produce was a rather stable latex. The unreacted butadiene was vented from the reactor at 50°–60° C. and the unreacted styrene was stripped from the latex by steam distillation.

EXAMPLE 2

Preparation of SBR-5-chloroacetoxymethyl-2-norbornene

Five latices were prepared as described in Example 1 except that 0.5–1.5 ml 5-chloroacetoxymethyl-2-norbornene was substituted in the initial charge to replace all of the N,N'-dimethyl-aminoethyl methacrylate. The resulting reaction product was also a rather stable latex.

EXAMPLE 3

Co-Coagulation of the Products of Examples 1 and 2

A portion of the latex of Example 1 was blended with a portion of the latex of Example 2 in a 50—50 ratio on the dry rubber basis. The latex blends were coagulated with 0.64% sulfuric acid solution containing 0.1% by weight coagulation aids at pH equal to 2.5–2.7. The coagulated rubbers were dried in an air circulation oven overnight.

The dried rubbers, having an ML(1+4) at 212° F. in the range of 55–65, were compounded with 50 parts by weight of carbon black per 100 parts by weight of total rubber in a Brabender blender mixer and pressure formed to tensile bar slabs with and without fabric backing at 200° F. for 20 minutes. The green tensile strength was measured on the un-backed slabs with an Instron tester and tack/stick values were tested on the fabric backed slabs using a Monsanto Tel-Tac tester. The conditions used for Tel-Tac testing were 8 oz. weight and 2 minutes dwelling time.

The results are shown in the following Table I which also compares the green strength and tack/stick value of comparable SBR rubbers without the described modifiers.

TABLE I

Green Strength and Tack/Stick Values of the Experimental Polymers

| Sample No. | DMM (%) | CCA (%) | Green Strength (psi) | Tack/Stick (oz./oz.) |
|---|---|---|---|---|
| Control | (No. 1 RSS) | | 40 | 35/5 |
| Control | (COPO ® 1778A) | | 34 | 5/8 |
| 413-16A | 0 | 0 | 38 | 6/10 |
| 413-16B | 0.75 | 0.125 | 46 | 12/12 |
| 413-16C | 0.75 | 0.175 | 50 | 19/23 |
| 413-16D | 0.75 | 0.225 | 49 | 15/19 |
| 413-16E | 0.75 | 0.300 | 54 | 10/10 |
| 413-16F | 0.75 | 0.375 | 47 | 13/8 |
| 413-16G | 1.0 | 0.125 | 57 | 17/13 |
| 413-16H | 1.0 | 0.175 | 44 | 13/20 |
| 413-16I | 1.0 | 0.225 | 59 | 15/20 |
| 413-16J | 1.0 | 0.300 | 62 | 16/14 |
| 413-16K | 1.0 | 0.375 | 46 | 12/15 |

In the foregoing table, the "DMM" represents N,N'-dimethyl aminoethyl methacrylate and the "CCA" represents the 5-chloroacetoxymethyl-2-norbornene. Table I shows significant improvement in green strength and tack/stick values, especially when the rubbers of Examples 1 and 2 are blended to provide 1.0 part of DMM per 0.255–0.30 part of CCA.

EXAMPLE 4

Preparation of SBR-Vinylbenzyl Chloride Latex (VBC)

The procedure of Example 2 was followed except that the 5-chloroacetoxymethyl-2-norbornene was replaced with 0.3–1.5 ml of vinylbenzyl chloride. The vinylbenzyl chloride used was a mixture of 60% meta and 40% para-isomers.

The co-coagulation and evaluation of green strength and tack/stick values were also carried out as previously described with blends of the latex of Example 1 with the latex of Example 4. The results are shown in the following Table II.

TABLE II

Green Strength and Tack/Stick Values of the Experimental Polymers

| Sample No. | Third Monomer Used DMM (%) | VBC (%) | Green Strength (psi) | Tack/Stick (oz./oz.) |
|---|---|---|---|---|
| Control | (No. 1 RSS) | | 40 | 35/5 |
| Control | (COPO ® 1778A) | | 34 | 5/8 |
| 413-19A | 0 | 0 | 41 | 4/7 |
| 413-19B | 0.5 | 0.075 | 55 | 9/13 |
| 413-19C | 0.5 | 0.125 | 66 | 14/12 |
| 413-19D | 0.5 | 0.2 | 69 | 9/11 |
| 413-19E | 0.5 | 0.3 | 67 | 12/14 |
| 413-19F | 0.5 | 0.375 | 59 | 10/7 |
| 413-19G | 0.75 | 0.075 | 73 | 10/15 |
| 413-19H | 0.75 | 0.125 | 78 | 9/12 |
| 413-19I | 0.75 | 0.2 | 52 | 5/15 |
| 413-19J | 0.75 | 0.3 | 70 | 8/14 |
| 413-19K | 0.75 | 0.375 | 80 | 10/11 |

It will be apparent from the results tabulated above that significant improvement in green strength and in tack/stick values is obtained from the blends of Examples 1 and 4.

I claim:

1. A method for producing a rubber compound having high green strength comprising
   (a) forming a conjugated diolefin rubber polymer wherein a conjugated diolefin is polymerized with a tertiary amine copolymerizable with the diolefin;
   (b) forming a conjugated diolefin rubber polymer wherein a conjugated diolefin is polymerized with a halogenated cross linking agent, said cross linking agent containing an unsaturated group polymerizable with the diolefin and being selected from the group consisting of a dihalobutene, a vinylbenzyl halide, and a 5-haloacetoxymethyl-2-norbornene; and,
   (c) blending together the products of (a) and (b).

2. The method as claimed in claim 1, in which the rubbery polymer of the two components is the same or different and selected from the group consisting of conjugated diolefin rubber polymers based upon $C_4$–$C_6$ diolefins and conjugates thereof, with styrene and derivatives thereof, and with acrylonitrile and derivatives thereof.

3. The method as claimed in claim 1, in which the rubber components are selected from the group consisting of a styrene-butadiene rubber and an acrylonitrile-butadiene rubber.

4. The method as claimed in claim 1, in which the monomer containing the tertiary amine group is a dialkyl amine acrylate or methacrylate.

5. The method as claimed in claim 4, in which the polymerizable monomer containing a tertiary amine group is selected from the group of dimethyl aminoethyl acrylate, dimethyl aminoethyl methacrylate, diethyl-aminoethyl acrylate and diethyl aminoethyl methacrylate.

6. The method as claimed in claim 1, in which the tertiary amine is present in the rubber in an amount within the range of 0.5–10 millimoles per 100 grams of rubber polymer.

7. The method as claimed in claim 1, in which the tertiary amine is present in the rubber component in an amount within the range of 0.75–7.5 millimoles per 100 grams of rubber polymer.

8. The method as claimed in claim 1, in which the tertiary amine is present in the rubber component in an amount within the range of 0.1–1.2 parts by weight of the rubber polymer.

9. The method as claimed in claim 1, in which the halogen cross linking agent is vinyl benzyl chloride.

10. The method as claimed in claim 1, in which the halogen cross linking agent is 5-chloroacetoxy methyl-2-norbornene.

11. The method as claimed in claim 1, in which the halogen cross linking agent is present in an amount within the range of 0.05–4% by weight of the rubbery polymer.

12. The method as claimed in claim 1, in which the halogen cross linking agent is present in an amount within the range of 0.25–2.5% by weight of the rubbery polymer.

* * * * *